(12) United States Patent
Sun et al.

(10) Patent No.: US 8,142,932 B2
(45) Date of Patent: Mar. 27, 2012

(54) CORE-SHELL SPINEL CATHODE ACTIVE MATERIALS FOR LITHIUM SECONDARY BATTERIES, LITHIUM SECONDARY BATTERIES USING THE SAME AND METHOD FOR PREPARING THEREOF

(75) Inventors: Yang Kook Sun, Seoul (KR); Ki Soo Lee, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 390 days.

(21) Appl. No.: 12/312,946

(22) PCT Filed: Dec. 5, 2006

(86) PCT No.: PCT/KR2006/005207
§ 371 (c)(1),
(2), (4) Date: May 28, 2009

(87) PCT Pub. No.: WO2008/069351
PCT Pub. Date: Jun. 12, 2008

(65) Prior Publication Data
US 2009/0272939 A1   Nov. 5, 2009

(51) Int. Cl.
*H01M 4/13*   (2010.01)
*H01M 4/50*   (2010.01)
*H01M 10/0562*   (2010.01)
*H01M 4/88*   (2006.01)

(52) U.S. Cl. ............... 429/218.1; 429/224; 429/322; 429/231.95; 252/182.1

(58) Field of Classification Search .............. None
See application file for complete search history.

(56) References Cited

U.S. PATENT DOCUMENTS
6,908,706 B2 *   6/2005   Choi et al. .............. 429/218.1

FOREIGN PATENT DOCUMENTS
KR   10 2006/0035547 A   4/2006
KR   10 2006/0105211 A   10/2006

OTHER PUBLICATIONS

Yoshio et al.; storage and cycling performance of Cr-modified spinel at elevated temperatures; (2001) *J. of Power Sources* 101:79-85.
Amatucci et al.; failure mechanism and improvement of the elevated temperature cycling of $LiMn_2O_4$ compounds through the use of the $LiAl_xMn_{2-x}O_{4-z}F_z$; *J. of the Electrochemical Society*, 148 (2) A171-A182 (2001).

* cited by examiner

*Primary Examiner* — Melvin Mayes
*Assistant Examiner* — Sheng H Davis
(74) *Attorney, Agent, or Firm* — Abelman, Frayne & Schwab (57) ABSTRACT

Disclosed herein is a core-shell spinel cathode active material for lithium secondary batteries. The core portion of the active material is made of a spinel manganese-containing material substituted with fluorine or sulfur, having 4V-grade potential and showing low-cost and high-output characteristics, and the shell portion, which comes into contact with an electrolyte, is made of a spinel transition metal-containing material, having excellent thermal stability and cycle life characteristics and showing low reactivity with the electrolyte. Thus, the cathode active material shows significantly improved cycle life characteristics and excellent thermal stability.

19 Claims, 8 Drawing Sheets

CORE-SHELL SPINEL CATHODE ACTIVE MATERIALS FOR LITHIUM SECONDARY BATTERIES, LITHIUM SECONDARY BATTERIES USING THE SAME AND METHOD FOR PREPARING THEREOF

TECHNICAL FIELD

The present invention relates to a long-cycle-life and high-output spinel cathode active material, in which an inner core portion and an outer shell portion have different transition metal composition distributions. More particularly, it relates to a spinel cathode active material, in which a shell portion formed on the outer surface of $Li_{1+a}[Mn_{1-x}M_x]_2O_{4-y}A_y$ showing the 4V-grade potential consists of a composition in which the dissolution of manganese does not occur, and thus the inner, outer and intermediate layers of the cathode active material have different transition metal composition distributions.

BACKGROUND ART

Since lithium ion secondary batteries were commercialized by Sony Corp., Japan, in the year 1991, they have been widely used as power sources of portable devices. With the recent development of the electronic, communication and computer industries, camcorders, mobile phones, notebook PCs, etc., have appeared and advanced remarkably, and the demand for lithium ion secondary batteries as power sources for driving such portable electronic information communication devices has increased day by day. Since hybrid electric vehicles (HEVs), which use internal combustion engines and nickel-hydrogen batteries as power sources, were put to practical use by Toyota Motor Co., Japan, in the year 1997, studies thereon have been actively conducted. Recently, studies using, as power sources for hybrid electric vehicles, lithium secondary batteries having excellent high energy density and excellent low-temperature operational characteristics compared to those of nickel-hydrogen batteries, have been actively conducted. In order to commercialize the lithium secondary batteries for hybrid electric vehicles, a cathode (positive electrode) material, comprising about 35% of the price of battery materials, must be an inexpensive material. The most suitable material for HEVs is spinel $LiMn_2O_4$, which operates at a potential of 4V and has low-cost and high-output characteristics. However, this spinel $LiMn_2O_4$ shows a reduction in capacity with the passage of time, because manganese therein is dissolved in an electrolyte as charge/discharge cycles progress. Particularly, this phenomenon is accelerated at a high temperature of more than 55° C., and thus it is impossible to use the spinel material in actual batteries. In an attempt to solve this phenomenon, many studies focused either on substituting the manganese site with lithium and transition metals or substituting the oxygen site with fluorine have been conducted (J. of Power Sources, 101(2001), 79). Among them, the most effective is $Li_{1+x}Ni_yMn_{2-x-y}O_{4-z}F_z$ (0.04≦x≦0.06, 0.025≦y≦0.05, 0.01≦z≦0.05), in which the manganese site is substituted with lithium and Ni and the oxygen site is substituted with fluorine. This material is known to have the best cycle life characteristics (J. Electrochem. Soc. 148 (2001) A171). However, this material also shows a slow decrease in capacity at high temperatures. In another attempt to solve this problem, studies on coating the surface of the spinel cathode material with ZnO in order to neutralize fluoric acid in an electrolyte and protect the surface have been conducted. However, this method did not completely solve the problem of the decrease in capacity caused by the dissolution of manganese.

Currently commercially available small-sized lithium ion secondary batteries employ $LiCoO_2$ in the cathode, and carbon in the anode. $LiCoO_2$ is an excellent material having stable charge/discharge characteristics, excellent electronic conductivity, high stability and smooth discharge voltage characteristics, but cobalt occurs only in small deposits, is expensive, and is, furthermore, toxic to the human body. For this reason, other materials need to be studied. Cathode materials, which are actively studied and developed, may include $LiNi_{0.8}Co_{0.2}O_2$, $LiNi_{0.8}Co_{0.1}Mn_{0.1}O_2$, and $Li[Ni_xCo_{1-2x}Mn_x]O_2$, such as $LiNi_{1/3}Co_{1/3}Mn_{1/3}O_2$, and $LiNi_{1/2}Mn_{1/2}O_2$. $LiNi_{0.8}Co_{0.2}O_2$ or $LiNi_{0.8}Co_{0.1}Mn_{0.1}O_2$ having a layered structure, like $LiCoO_2$, has not yet been commercialized, because they are difficult to synthesize at stoichiometric ratios and have problems related to thermal stability. However, a core-shell cathode active material, which uses $LiNi_{0.8}Co_{0.2}O_2$ or $LiNi_{0.8}Co_{0.1}Mn_{0.1}O_2$, having a high capacity, in the core, and a layered transition metal $LiNi_{1/2}Mn_{1/2}O_2$, having excellent thermal stability and cycle-life characteristics, in the shell, was recently synthesized (Korean Patent Application No. 10-2004-0118280). This material has significantly improved thermal stability and cycle-life characteristics. Recently, $LiNi_{1/3}Co_{1/3}Mn_{1/3}O_2$, a kind of $Li[Ni_xCo_{1-2x}Mn_x]O_2$, has started to be substituted for $LiCoO_2$, and the use thereof as a cathode material for small-sized batteries, particularly by Japanese battery makers Sanyo Corp. and Sony Corp. has increased. Recently, $LiMn_2O_4$, which is environmentally friendly and inexpensive, has been used in some of small-sized batteries, but is expected to be used mainly in large-sized batteries, particularly hybrid electric vehicles (HEVs). However, 4V-grade spinel $LiMn_2O_4$ has poor cycle-life characteristics, because of structural transition called Jahn-Teller distortion, which is caused by $Mn^{3+}$, and the resulting Mn dissolution. Particularly, at a high temperature of more than 55° C., the manganese dissolution in this material is accelerated by reaction with fluoric acid (HF) in an electrolyte to rapidly deteriorate the cycle life characteristics of this material, making it difficult to commercialize this material.

Recently, a patent was reported in which was prepared a double-layer cathode material consisting of a core made of 4V-grade spinel $LiMn_2O_4$ and a shell made of $LiNi_{0.5}Mn_{1.5}O_4$, causing no manganese dissolution problem, using a carbonate method (Korean Patent Application No. 10-2005-0027683). The cathode material prepared using the carbonate method doesn't have significantly improved cycle life characteristics, because it has a large specific surface area, but it is difficult to control the composition thereof. Also, manganese oxide prepared using a coprecipitation method with the carbonate method has low tap density, which makes it difficult to obtain batteries having high energy density. Furthermore, because the manganese oxide consists of secondary particles having weak binding force between primary particles, it is difficult to maintain the manganese oxide in a spherical particle shape upon the production of battery electrode plates.

DISCLOSURE

Technical Problem

Accordingly, it is an object of the present invention to solve various problems associated with a decrease in capacity caused by manganese dissolution at high temperatures, which is a problem occurring in the prior art. For this purpose, in the present invention, a core-shell precursor is synthesized by synthesizing a monodispersed spherical 4V-grade precursor material and encapsulating the synthesized precursor material with a high-manganese-content spinel cathode active material having excellent cycle life characteristics. The core-shell precursor is mixed with a lithium salt, and then calcined at high temperatures, thus synthesizing a cathode active material for lithium secondary batteries, which has excellent thermal stability and cycle life characteristics.

Technical Solution

To achieve the above object, the present inventors have solved the problem of manganese dissolution by synthesizing a spherical manganese metal oxide $((Mn_{1-x}M_x)_3O_4)$ precursor powder having high tap density through a coprecipitation method using hydroxide, to form a 4V-grade precursor as a core, and encapsulating the 4V-grade precursor with the hydroxide form of a lithium excess spinel precursor, which has mainly $Mn^{4+}$ ions, and does not undergo lithium dissolution even when it comes into contact with fluoric acid in an electrolyte, thus forming a shell. The cathode material thus synthesized has high charge density, and excellent cycle life characteristics, capacity characteristics and efficiency characteristics.

To achieve the above object, according to the present invention, there is provided a cathode active material for lithium secondary batteries, which has a core-shell multilayer structure, in which the core portion is made of $Li_{1+a}Mn_{2-a}O_{4-y}A_y$ (wherein A is at least one element selected from among F and S, $0.04 \leq a \leq 0.15$, and $0.02 \leq y \leq 0.15$), and the shell portion is made of $Li[Li_a(Mn_{1-x}M_x)_{1-a}]_2O_{4-y}A_y$ (wherein M is at least one element selected from the group consisting of Fe, Co, Ni, Cu, Cr, V, Ti and Zn, A is at least one element selected from among F and S, $0.01 \leq a \leq 0.333$, $0.01 \leq x \leq 0.6$, and $0.02 \leq y \leq 0.15$).

In another embodiment of the present invention, there is provided a cathode active material for lithium secondary batteries, which has a core-cell multilayer structure, in which the core portion is made of $Li_{1+a}[Mn_{1-x}M_x]_{2-a}O_{4-y}A_y$ (wherein M is at least one element selected from the group consisting of Mg, Ca, Sr, Al, Ga, Fe, Co, Ni, V, Ti, Cr, Cu, Zn, Zr, In, Sb, P, Ge, Sn, Mo and W, A is at least one element selected from among F and S, $0.04 \leq a \leq 0.15$, $0.02 \leq x \leq 0.25$, and $0.02 \leq y \leq 0.15$), and the shell portion is made of $Li[Li_a(Mn_{1-x}M_x)_{1-a}]_2O_{4-y}A_y$ (wherein M is at least one element selected from the group consisting of Fe, Co, Ni, Cu, Cr, V, Ti and Zn, A is at least one element selected from among F and S, $0.01 \leq a \leq 0.333$, $0.01 \leq x \leq 0.6$, and $0.02 \leq y \leq 0.15$).

In the above cathode active material according to the present invention, the shell portion preferably has a thickness corresponding to 1-50% of the total radius of the cathode active material.

Also, the cathode active material preferably has a particle diameter of 1-50 μm.

According to another aspect of the present invention, there is provided an electrode for lithium secondary batteries, which comprises said cathode active material.

According to still another aspect of the present invention, there is provided a lithium secondary battery comprising said electrode for lithium secondary batteries.

As a preferred method of preparing the inventive cathode active material for lithium secondary batteries, having a core-shell multilayer structure, there is provided a method of preparing a cathode active material for lithium secondary batteries, having a core-shell multilayer structure, the method comprising the steps of: a) introducing an aqueous ammonia solution or ammonium sulfate $((NH_4)_2SO_4)$, an aqueous manganese composite metal salt solution and a basic aqueous solution into a reactor under an air atmosphere, and mixing the solutions with each other in the reactor, to obtain a spherical composite metal oxide precipitate; b) mixing an aqueous ammonia solution or ammonium sulfate $((NH_4)_2SO_4)$, said spherical composite metal oxide precipitate, a transition metal-containing metal salt aqueous solution and a basic aqueous solution with each other in a reactor under a nitrogen atmosphere to obtain a double-layer composite metal hydroxide precipitate having a core-shell structure containing transition metal hydroxide as the shell; c) filtering said composite metal oxide-composite metal hydroxide precipitate, washing the filtrated material with water, drying the washed material to obtain a $[(M_xMn_{1-x})_3O_4]_{1-z}[(M'_yMn_{1-y})(OH)_2]_z$ precursor, and drying or pre-heat treating the precursor, and d) mixing said precursor with any one selected from among lithium hydroxide (LiOH)/lithium fluoride (LiF), lithium hydroxide (LiOH)/lithium sulfide ($Li_2S$), and lithium hydroxide (LiOH)/solid sulfur, at a desired composition ratio, maintaining the mixture at 400-650° C. for 5-10 hours, grinding the resulting mixture, calcining the powder at 700-1100° C. for 6-25 hours, and annealing the calcined powder at 500-700° C. for 10 hours.

In the inventive method, the metal salt in each of the steps a) and b) is preferably any one selected from among sulfate, nitrate, acetate, chloride and phosphate.

Also, the basic aqueous solution in each of the steps a) and b) is an aqueous solution of sodium hydroxide (NaOH) or potassium hydroxide (KOH).

Preferably, the manganese composite metal salt aqueous solution in the step a) is prepared by mixing Mn with at least one metal salt selected from the group consisting of Mg, Ca, Sr, Al, Ga, Fe, Co, Ni, V, Ti, Cr, Cu, Zn, Zr, In, Sb, P, Ge, Sn, Mo and W, and dissolving the mixture in water to a concentration of 0.5-3 M, the aqueous ammonia solution is used at a concentration corresponding to 20-40% of the concentration of the manganese composite metal salt aqueous solution, and the aqueous basic solution is used at a concentration of 4-5 M.

Preferably, the transition metal-containing metal salt aqueous solution in the step b) is prepared by mixing with at least one metal salt selected from the group consisting of Fe, Co, Ni, Cu, Cr, V, Ti and Zn and dissolving the mixture in water to a concentration of 0.5-3 M, the aqueous ammonia solution is used at a concentration corresponding to 20-40% of the concentration of the transition metal-containing metal salt aqueous solution, and the aqueous basic solution is used at a concentration of 4-5 M.

Preferably, the pH within the reactor in the step a) is 9.5-10.5, the reaction temperature in the step a) is 30-80° C., and the rotating speed of a stirrer in the reactor is 500-2000 rpm.

Preferably, the pH within the reactor in the step b) is 10.5-12.5, the reaction temperature in the step b) is 30-80° C., and the rotating speed of a stirrer in the reactor is 500-2000 rpm.

Preferably, the reaction time in the step b) is controlled to 0.5-10 hours to control the thickness of the shell layer.

Preferably, the drying or pre-heating in the step (c) is either drying at 110° C. for 15 hours or heating at 400-550° C. for 5-10 hours.

Advantageous Effects

In the core-shell spinel cathode active material for lithium secondary batteries according to the present invention, the core portion is made of a spinel manganese-containing material substituted with fluorine or sulfur, having the 4V-grade potential and showing low-cost and high-output characteristics, and the shell portion, which comes into contact with an electrolyte, is made of a spinel transition metal-containing material, having excellent thermal stability and cycle life characteristics and showing low reactivity with the electrolyte. Thus, the cathode active material shows significantly improved cycle life characteristics.

BEST MODE

Hereinafter, the present invention will be described in further detail.

A cathode active material for lithium secondary batteries according to one embodiment of the present invention has a core-shell multilayer structure, in which the core portion is made of $Li_{1+a}Mn_{2-a}O_{4-y}A_y$ (wherein A is at least one element selected from among F and S, $0.04 \leq a \leq 0.15$, and $0.02 \leq y \leq 0.15$), and the shell portion is made of $Li[Li_a(Mn_{1-x}M_x)_{1-a}]_2O_{4-y}A_y$ (wherein M is at least one element selected from the group consisting of Fe, Co, Ni, Cu, Cr, V, Ti and Zn, A is at least one element selected from among F and S, $0.01 \leq a \leq 0.333$, $0.01 \leq x \leq 0.6$, and $0.02 \leq y \leq 0.15$).

According to another embodiment of the present invention, there is provided a cathode active material for lithium secondary batteries, which has a core-cell multilayer structure, in which the inner core portion having the 4V-grade potential is made of $Li_{1+a}[Mn_{1-x}M_x]_{2-a}O_{4-y}A_y$ (wherein M is at least one element selected from the group consisting of Mg, Ca, Sr, Al, Ga, Fe, Co, Ni, V, Ti, Cr, Cu, Zn, Zr, In, Sb, P, Ge, Sn, Mo and W, A is at least one element selected from among F and S, $0.04 \leq a \leq 0.15$, $0.02 \leq x \leq 0.25$, and $0.02 \leq y \leq 0.15$), and the outer shell portion is made of $Li[Li_a(Mn_{1-x}M_x)_{1-a}]_2O_{4-y}A_y$ (wherein M is at least one element selected from the group consisting of Fe, Co, Ni, Cu, Cr, V, Ti and Zn, A is at least one element selected from among F and S, $0.01 \leq a \leq 0.333$, $0.01 \leq x \leq 0.6$, and $0.02 \leq y \leq 0.15$).

In the present invention, the amount of fluorine and sulfur, which are anions contained in the cathode active material having the core-shell structure, is preferably 0.005-0.05 moles based on 1 mole of oxygen. If the amount of the substituted anions is less than 0.005 moles based on 1 mole of oxygen, the effect of improving cycle life and thermal stability characteristics will not be shown, and if it is more than 0.05 moles, the capacity of the active material will be decreased and the cycle life characteristics thereof will also be reduced.

According to another aspect, the present invention provides a method for preparing a cathode active material for lithium secondary batteries, the method comprising the steps of: mixing an aqueous ammonia solution or ammonium sulfate, an aqueous manganese composite metal salt solution and a basic aqueous solution with each other in a reactor under an air atmosphere while adjusting the pH of the mixture solution to 9.5-10.5, and allowing the mixture to react for a given time (12-24 hours), to obtain a spherical composite metal oxide; mixing an aqueous ammonia solution or ammonium sulfate, said spherical composite metal oxide precipitate, a transition metal-containing metal salt aqueous solution and a basic aqueous solution with each other in a reactor having a nitrogen atmosphere while adjusting the pH of the mixture solution to 10.5-11.5, to obtain a composite metal oxide-composite metal hydroxide precipitate having a core-shell structure, in which the composite metal hydroxide covers the composite metal oxide; drying or thermally treating said precipitate to obtain a composite metal hydroxide-oxide or composite metal oxide having a core-shell structure; and mixing said core-shell composite metal precursor with a lithium salt, calcining the lithium salt-containing mixture at 700-1100° C. for 6-25 hours, and annealing the calcined mixture at 500-700° C., thus obtaining a spinel lithium composite metal oxide having a core-shell structure.

Figure 1:
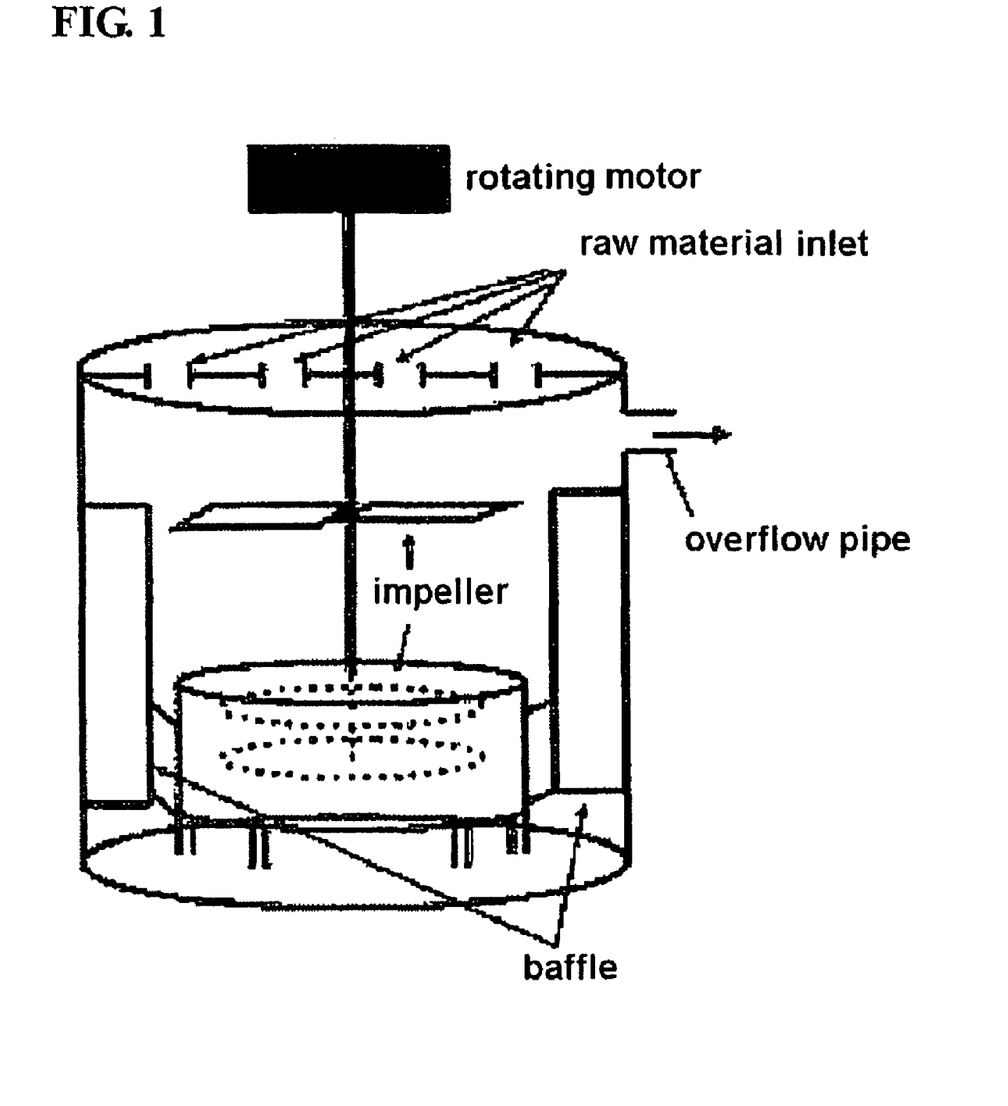
FIG. 1 is a perspective view of the reactor used in the preparation method according to the present invention.
Figure 2:
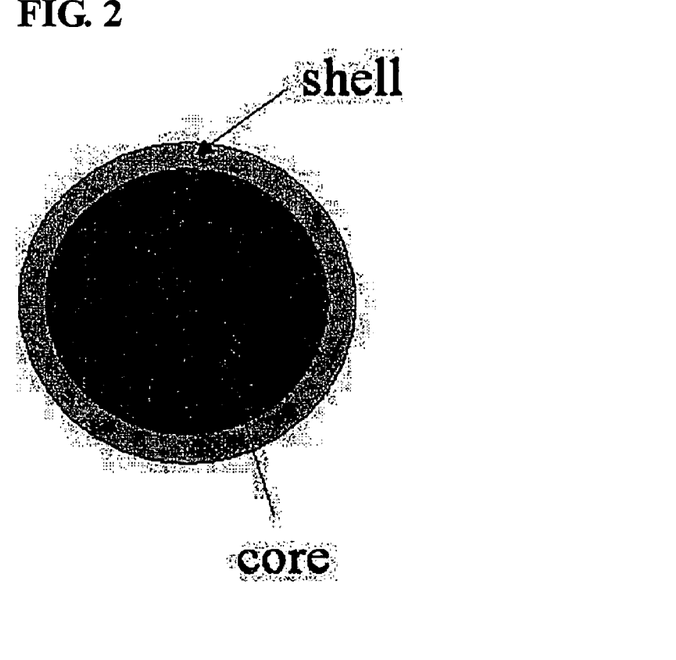
FIG. 2 is a cross-sectional view of the double-layer core-shell structure of a cathode active material prepared in the present invention.

FIG. 1 is a perspective view of a reactor used in the preparation method of the cathode active material according to the present invention. The reactor has a structure in which an impeller is designed in the form of an inverted impeller, and four baffles are spaced 2-3 cm apart from the inner wall of the reactor. Also, a cylinder is disposed between the baffles to ensure uniform vertical mixing in the reactor. The design of the inverted impeller also serves to ensure uniform vertical mixing in the reactor, and the reason that the baffles disposed in the reactor are spaced apart from the inner wall of the reactor is to regulate the intensity and concentration of waves and to increase the turbulent effect to solve the local non-uniformity of the reaction solution.

In the inventive method, Mn and M (wherein M is at least one element selected from the group consisting of Mg, Ca, Sr, Al, Ga, Fe, Co, Ni, V, Ti, Cr, Cu, Zn, Zr, In, Sb, P, Ge, Sn, Mo and W) at a ratio of 1-x:x ($0.02 \leq x \leq 0.25$) are first dissolved in distilled water. The metal composite precursor, an aqueous ammonia solution and a basic aqueous solution are mixed with each other in the reactor.

The metal salt in each of the step a) and the step b) is preferably any one selected from among sulfate, nitrate, acetate, chloride and phosphate, and the basic aqueous solution is preferably sodium hydroxide (NaOH) or potassium hydroxide (KOH).

Herein, the manganese composite metal salt aqueous solution is preferably used at a concentration of 0.5-3 M, the aqueous ammonia solution is used at a concentration corresponding to 20-40% of the concentration of the manganese composite metal salt aqueous solution, and the aqueous sodium hydroxide solution is used at a concentration of 4-5 M.

The reason why the concentration of the aqueous ammonia solution is 20-40% of the concentration of the manganese composite metal salt aqueous solution is that, even though ammonia reacts with the metal precursor at a ratio of 1:1, an intermediate product can be recovered and used as ammonia. Another reason is that this concentration is an optimal condition for increasing the crystallinity of the cathode active material and stabilizing the cathode active material.

Also, the reaction between the materials is preferably carried out simultaneously with the addition of the sodium hydroxide solution such that the pH of the mixed solution is maintained at 9.5-10.5. Furthermore, the reaction time in the reactor is preferably controlled to 12-20 hours.

In order to obtain a spherical spinel composite metal oxide precursor powder having a high manganese content and tap density, the reaction needs to be carried out in an air atmosphere. If the atmosphere of the reactor is a nitrogen or argon atmosphere, it will be difficult to form spherical powder, because some of the produced $Mn(OH)_2$ will be oxidized to an impurity in the form of $Mn_2O_3$, while $Mn(OH)_2$ will have a needle shape. If the atmosphere of the reactor is an oxygen atmosphere, spherical powder can be obtained, but the oxidation rate of manganese will be increased to reduce tap density and widen the particle size distribution of the resulting powder.

After the precursor oxide of forming the core (inner layer) is obtained, a precursor hydroxide having a spinel composition, in which the oxidation number of Mn is 4+, is encapsulated on the composite metal oxide precursor, thus forming a shell (outer layer). Particularly, if the oxidation number of Mn is 4+, it is possible to prevent structural transition (Jahn-Teller distortion) caused by the 3+ or 4+ valent oxidation/reduction reaction of Mn in the prior orthorhombic or layered $LiMnO_2$, and thus the structure of the cathode active material during charge/discharge cycles will be stabilized to solve the manganese dissolution problem and improve cycle life characteristics.

While the composite metal oxide in the reactor is maintained as it is, the metal salt aqueous solution is changed in the following manner. First Mn and M' (where M' is at least one element selected from the group consisting of Fe, Co, Ni, Cu, Cr, V, Ti and Zn) at a ratio of 1-y:y ($0.01 \leq y \leq 0.6$) are dissolved in distilled water. Each of the composite metal precursor, an aqueous ammonia solution and a basic aqueous solution is continuously fed into the reactor using a metering pump. Herein, it is preferable that the mixed metal aqueous solution be used at a concentration of 0.5-3 M, the aqueous ammonia solution be used at a concentration corresponding to 20-40% of the concentration of the mixed metal aqueous solution, and the aqueous sodium hydroxide solution be used at a concentration of 4-5 M. The reaction of the mixed solution in the reactors is carried out under nitrogen flow for 0.5-10 hours at the same time as the addition of the sodium hydroxide solution, such that the pH of the mixed solution is maintained at 10.5-12.5, thus forming a $(Mn_{1-y}M'_y)(OH)_2$ layer as a shell layer. The nitrogen atmosphere and pH range are conditions for forming an optimal hydroxide precursor.

The thickness of the shell layer can be controlled according to the synthesis time of the shell layer precursor in the reactor. Specifically, the thickness of the shell layer can be controlled by controlling the reaction time to 0.5-10 hours.

To employ the high-output characteristics of the inner $Li_{1+a}[Mn_{1-x}M_x]_2O_{4-y}A_y$ layer in the core-shell structure, the thickness of the $Li[Li_a(Mn_{1-x}M_x)_{1-a}]_2O_{4-y}A_y$ shell covering the inner layer is preferably 1-50% based on the total thickness of the cathode active material. To further take advantage of the high-output characteristics, the thickness of the shell is more preferably less than 30%, and even more preferably less than 20%. However, if the thickness of the $Li[Li_a(Mn_{1-x}M_x)_{1-a}]_2O_{4-y}A_y$ shell layer is less than 1%, the cycle life characteristics of the cathode active material will be deteriorated.

The composite metal oxide/hydroxide having the core-shell structure thus obtained is washed with distilled water and then filtered. The filtered material is dried at 110° C. for 15 hours or heated at 400-550° C. for 5-10 hours to prepare it for use as a precursor.

Then, using a dry method or a wet method of carrying out a mixing process in an aqueous solution containing a chelating agent such as citric acid, tartaric acid, glycolic acid or maleic acid, the precursor is mixed with any one mixture selected from among lithium hydroxide (LiOH)/lithium fluoride (LiF), lithium hydroxide (LiOH)/lithium sulfide ($Li_2S$), and lithium hydroxide (LiOH)/solid sulfur. Then, the mixture is preliminarily calcined at 400-650° C., is mixed well and is calcined at 700-1100° C. in an oxidative atmosphere for 6-25 hours. The calcined material is annealed at 500-700° C. for 10 hours, thus preparing a cathode active material for lithium secondary batteries, having a core-shell structure.

The above-prepared cathode active material for lithium secondary batteries, having the core-shell structure, preferably has a specific surface area of less than 3 $m^2/g$. This is because, if the specific surface area is more than 3 $m^2/g$, it will increase reactivity with an electrolyte and thus increase the generation of gas.

Also, if the inventive reactor is used, the tap density of the resulting precursor will be increased by at least about 40% compared to when the prior reactor is used. The tap density of the precursor is more than 1.5 $g/cm^3$, preferably more than 1.7 $g/cm^3$, and still more preferably more than 1.8 $g/cm^3$.

Also, the present invention can provide an electrode for lithium secondary batteries, comprising said cathode active material. In addition, the present invention can provide a lithium secondary battery comprising said electrode for lithium secondary batteries.

MODE FOR INVENTION

The following examples are intended to provide non-limiting illustrations of the method for preparing a cathode active material for lithium secondary batteries according to the present invention, but the scope of the present invention is not limited thereto.

Example 1

For the preparation of a 4V-grade spherical manganese composite oxide, 4 L of distilled water was first fed into a coprecipitation reactor (capacity: 4 L, and rotating motor output: more than 80 W) shown in FIG. 1. Then, 0.07-0.1 M aqueous ammonia solution was fed into the coprecipitation reactor. Air was fed into the reactor at a rate of 1 L/min such that the atmosphere in the reactor remained an oxidative atmosphere. The contents of the reactor were stirred at 1100 rpm while the temperature in the reactor was maintained at 50° C. A 2M metal salt aqueous solution containing a mixture of manganese sulfate and nickel sulfate at a molar ratio of 0.975:0.025 was continuously fed into the reactor at a rate of 0.3 L/hr, and a 4.28M aqueous ammonia solution was continuously fed into the reactor at a rate of 0.03 L/hr. For the adjustment of pH, a 4M sodium hydroxide aqueous solution was fed into the reactor to adjust the contents of the reactor to a pH of 10. The impeller speed of the reactor was controlled to 1100 rpm, and the mean residence time of the reaction materials in the reactor was controlled to about 6 hours, thus obtaining trimanganese-nikel tetraoxide (($Ni_{0.025}Mn_{0.975}$)$_3$O$_4$).

After the addition of the nickel/manganese composite metal aqueous solution to the above-obtained trimanganese-nickel tetraoxide ($Ni_{0.025}Mn_{0.975}$)$_3$O$_4$ was stopped, the previously fed composite metal aqueous solution was maintained in the reactor such that it completely reacted with the tetraoxide, thus obtaining an oxide having high density. To the synthesized trimanganese-nickel tetraoxide, a 2M composite metal aqueous solution containing a mixture of manganese sulfate and nickel sulfate at a molar ratio of 0.75:0.25 was added. Herein, the concentration of the aqueous ammonia solution was changed from 4.28M to 7.93M, and the feed gas was changed to nitrogen gas, thus forming a reducing atmosphere. A 4M sodium hydroxide solution was fed into the reactor at a rate of 0.3 L/hr to adjust the pH of the reactor contents to 11, thus obtaining a (($Mn_{0.975}Ni_{0.025}$)$_3$O$_4$)$_{0.7}$($Mn_{0.75}Ni_{0.25}$(OH)$_2$)$_{0.3}$ precursor having a core cell structure, in which the shell layer was encapsulated with composite metal hydroxide ($Mn_{0.75}Ni_{0.25}$)(OH)$_2$. Herein, to make the shell layer, the manganese/nickel composite metal aqueous solution was fed for 2 hours and allowed to react.

The ($Mn_{0.975}Ni_{0.025}$)$_3$O$_4$)$_{0.7}$($Mn_{0.75}Ni_{0.25}$(OH)$_2$)$_{0.3}$ precursor obtained in the reactor was washed with distilled water, filtered, and dried in a hot air dryer at 110° C. for 12 hours to remove the remaining water. The precursor, lithium hydroxide (LiOH) and lithium fluoride (LiF) were mixed with each other at a molar ratio of 1:1:0.05, and the mixture was heated at a heating rate of 2° C./min, maintained at 500° C. for 5 hours, and then calcined at 850° C. for 12 hours, thus obtaining a spinel cathode active material powder in the form of [Li$_{1.05}$[Mn$_{1.9}$Ni$_{0.05}$]O$_{3.95}$F$_{0.05}$]$_{0.7}$-[Li[Li$_{0.05}$(Ni$_{0.5}$Mn$_{1.5}$)$_{0.95}$]O$_{3.95}$F$_{0.05}$]$_{0.3}$, having a core-shell structure, in which the core layer was made of [Li$_{1.05}$[Mn$_{1.9}$Ni$_{0.05}$]O$_{3.95}$F$_{0.05}$], and the shell layer was made of Li[Li$_{0.05}$(Ni$_{0.5}$Mn$_{1.5}$)$_{0.95}$]O$_{3.95}$F$_{0.05}$.

Example 2

Cathode active material powder was prepared in the same manner as in Example 1, except that, during the synthesis of the shell in the core-shell reaction process, an air atmosphere was used instead of the nitrogen atmosphere.

Example 3

Cathode active material powder was prepared in the same manner as in Example 1, except that, in the calcining process, the precursor obtained in Example 1 and lithium hydroxide were mixed with each other at a molar ratio of 1:1.05.

Example 4

For the preparation of a 4V-grade spherical manganese oxide, 4 L of distilled water was first fed into a coprecipitation reactor (capacity: 4 L, and rotating motor output: more than 80 W). Then, 0.07-0.1 M aqueous ammonia solution was fed into the coprecipitation reactor. Air was fed into the reactor at a rate of 1 L/min such that the atmosphere in the reactor was maintained at an oxidative atmosphere. The contents of the reactor were stirred at 1100 rpm while the temperature in the reactor was maintained at 50° C. A 2M manganese sulfate metal salt aqueous solution was continuously fed into the reactor at a rate of 0.3 L/hr, and a 4.28M aqueous ammonia solution was continuously fed into the reactor at a rate of 0.03 L/hr. For the adjustment of pH, a 4M sodium hydroxide aqueous solution was fed into the reactor to adjust the contents of the reactor to a pH of 10. The impeller speed of the reactor was maintained at 1100 rpm, and the mean residence time of the reaction materials in the reactor was set at about 6 hours, thus obtaining a trimanganese tetraoxide (Mn$_3$O$_4$) precursor.

After the addition of the manganese sulfate metal salt aqueous solution to the above-obtained trimanganese tetraoxide (Mn$_3$O$_4$) was stopped, the previously fed composite metal aqueous solution was maintained in the reactor such that it completely reacted with the tetraoxide, thus obtaining an oxide having high density. To the synthesized trimanganese tetraoxide, a 2M composite metal aqueous solution containing a mixture of manganese sulfate and nickel sulfate at a molar ratio of 0.75:0.25 was added. Herein, the concentration of the aqueous ammonia solution was changed from 4.28M to 7.93M, and the feed gas was changed to nitrogen gas, thus forming a reducing atmosphere. A 4M sodium hydroxide solution was fed into the reactor at a rate of 0.3 L/hr to adjust the pH of the reactor contents to 11, thus obtaining a ((Mn$_3$O$_4$)$_{0.7}$(Mn$_{0.75}$Ni$_{0.25}$(OH)$_2$)$_{0.3}$) precursor having a core cell structure, in which the shell layer was encapsulated with composite metal hydroxide (Mn$_{0.75}$Ni$_{0.25}$)(OH)$_2$. Herein, to make the shell layer, the manganese/nickel composite metal aqueous solution was fed for 2 hours and allowed to react.

The ((Mn$_3$O$_4$)$_{0.7}$(Mn$_{0.75}$Ni$_{0.25}$(OH)$_2$)$_{0.3}$) precursor obtained in the reactor was washed with distilled water, filtered, and dried in a hot air dryer at 110° C. for 12 hours to remove the remaining water. The precursor, lithium hydroxide (LiOH) and lithium fluoride (LiF) were mixed with each other at a molar ratio of 1:1:0.05, and the mixture was heated at a heating rate of 2° C./min, maintained at 500° C. for 5 hours, and then calcined at 850° C. for 12 hours, thus obtaining a spinel cathode active material powder in the form of [Li$_{1.05}$Mn$_{1.95}$O$_{3.95}$F$_{0.05}$]$_{0.7}$-[Li[Li$_{0.05}$(Ni$_{0.5}$Mn$_{1.5}$)$_{0.95}$]O$_{3.95}$F$_{0.05}$]$_{0.3}$, having a core-shell structure, in which the core layer was made of Li$_{1.05}$Mn$_{1.95}$O$_{3.95}$F$_{0.05}$, and the shell layer was made of Li[Li$_{0.05}$(Ni$_{0.5}$Mn$_{1.5}$)$_{0.95}$]O$_{3.95}$F$_{0.05}$.

Example 5

Cathode active material powder was synthesized in the same manner as in Example 4, except that, during the synthesis of the shell in the core-shell reaction process, an air atmosphere was used instead of the nitrogen atmosphere.

Example 6

Cathode active material powder was prepared in the same manner as in Example 4, except that, in the calcining process, the precursor obtained in Example 4 and lithium hydroxide were mixed with each other at a molar ratio of 1:1.05.

Example 7

Cathode active material powder was prepared in the same manner as in Example 5, except that, in the calcining process, the precursor obtained in Example 4 and lithium hydroxide were mixed with each other at a molar ratio of 1:1.05.

Example 8

Cathode active material powder was prepared in the same manner as in Example 4, except that, in the calcining process, the temperature was 750° C., and ammonium fluoride was used instead of lithium fluoride (LiF).

Example 9

A 4V-grade spherical manganese composite oxide was prepared in the same manner as in Example 1. Then, the preparation of a transition metal composite-hydroxide structure having a core-shell structure was carried out in the following manner using the manganese composite oxide. After the addition of Ni and Mn to the above-obtained trimanganese-nickel tetraoxide $(Ni_{0.025}Mn_{0.975})_3O_4$ was stopped, the previously fed composite metal aqueous solution was maintained in the reactor such that it completely reacted with the tetraoxide, thus obtaining an oxide having high density. Then, to coat the oxide with $(Ni_{0.5}Mn_{0.5})(OH)_2$ corresponding to an outer shell, the feeding of the metal salt solution containing the manganese sulfate and nickel sulfate at a molar ratio of 0.975:0.025 was replaced with a 2M mixture solution of nickel sulfate and manganese sulfate, mixed at a molar ratio of 0.5:0.5. Also, the concentration of the aqueous ammonia solution was changed to 7.93M, and the feed gas was changed to nitrogen gas, thus forming a reducing atmosphere. A 4M sodium hydroxide solution was continuously fed into the reactor at a rate of 0.3 L/hr and at a ratio of 1:1 with respect to the metal aqueous solution so as to adjust the pH of the reactor contents to 11. Thus, a $(((Mn_{0.975}Ni_{0.025})_3O_4)_{1-z}(Ni_{0.5}Mn_{0.5})(OH)_2)_z$ precursor consisting of a core-shell structure having the composite metal hydroxide $(Ni_{0.5}Mn_{0.5})(OH)_2$ as the outer shell was obtained. Herein, to make the shell layer, the manganese/nickel composite metal aqueous solution was fed for 2 hours and allowed to react.

The $(((Mn_{0.975}Ni_{0.025})_3O_4)_{1-z}(Ni_{0.5}Mn_{0.5})(OH)_2)_z$ precursor obtained in the reactor was washed with distilled water, filtered, and dried in a hot air dryer at 110° C. for 12 hours to remove the remaining water. The precursor, lithium hydroxide (LiOH) and lithium fluoride (LiF) were mixed with each other at a molar ratio of 1:1:0.05, and the mixture was heated at a heating rate of 2° C./min, maintained at 500° C. for 5 hours, and then calcined at 900° C. for 12 hours, thus obtaining a spinet cathode active material powder in the form of $[LiMn_{1.95}Ni_{0.05}O_{3.95}F_{0.05}]_{1-z}$-$[LiNi_{0.5}Mn_{0.5}O_{3.95}F_{0.05}]_z$, having a core-shell structure, in which the core layer was made of $LiMn_{1.95}Ni_{0.05}O_{3.95}F_{0.05}$, and the shell layer was made of $LiNi_{0.5}Mn_{0.5}O_{3.95}F_{0.05}$.

Comparative Example 1

Cathode active material powder was synthesized in the same manner as in Example 1, except that the shell layer was made of $Li_{1.05}Mn_{1.9}Ni_{0.05}O_{3.95}F_{0.05}$ instead of $Li[Li_{0.05}(Ni_{0.5}Mn_{1.5})_{0.95}]O_{3.95}F_{0.05}$.

Comparative Example 2

Cathode active material powder was synthesized in the same manner as in Example 3, except that the shell layer was made of $Li_{1.05}Mn_{1.9}Ni_{0.05}O_4$ instead of $Li[Li_{0.05}(Ni_{0.5}Mn_{1.5})_{0.95}]O_{3.95}F_{0.05}$.

Comparative Example 3

Cathode active material powder was synthesized in the same manner as in Example 1, except that the shell layer was made of $Li_{1.05}Mn_{1.95}O_{3.95}F_{0.05}$ instead of $Li[Li_{0.05}(Ni_{0.5}Mn_{1.5})_{0.95}]O_{3.95}F_{0.05}$.

Comparative Example 4

Cathode active material powder was synthesized in the same manner as in Examples 6 and 7, except that the shell layer was made of $Li_{1.05}Mn_{1.95}O_4$ instead of $Li[Li_{0.05}(Ni_{0.5}Mn_{1.5})_{0.95}]O_{3.95}F_{0.05}$.

Comparative Example 5

Cathode active material powder was synthesized in the same manner as in Example 8, except that the shell layer was made of $Li_{1.05}Mn_{1.95}O_{3.95}F_{0.05}$ instead of $Li[Li_{0.05}(Ni_{0.5}Mn_{1.5})_{0.95}]O_{3.95}F_{0.05}$.

XRD and SEM were used to assess the characteristics of the double-layer core-shell cathode active materials prepared in Examples and Comparative Examples above.

Figure 3:
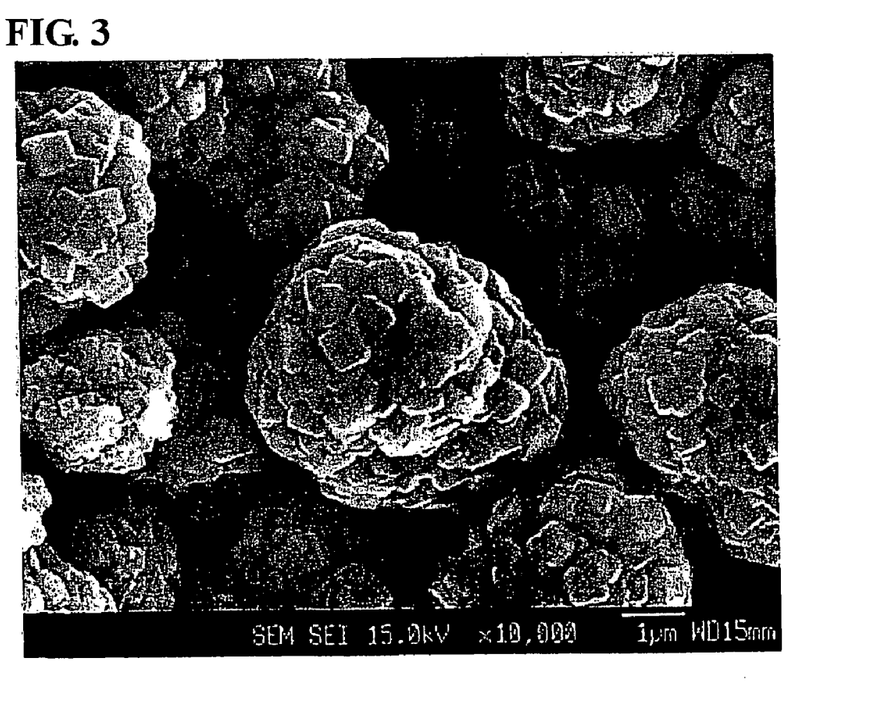
FIG. 3 is an SEM photograph of a $(Ni_{0.025}Mn_{0.975})_3O_4$ precursor as a core portion according to the present invention.
Figure 4:
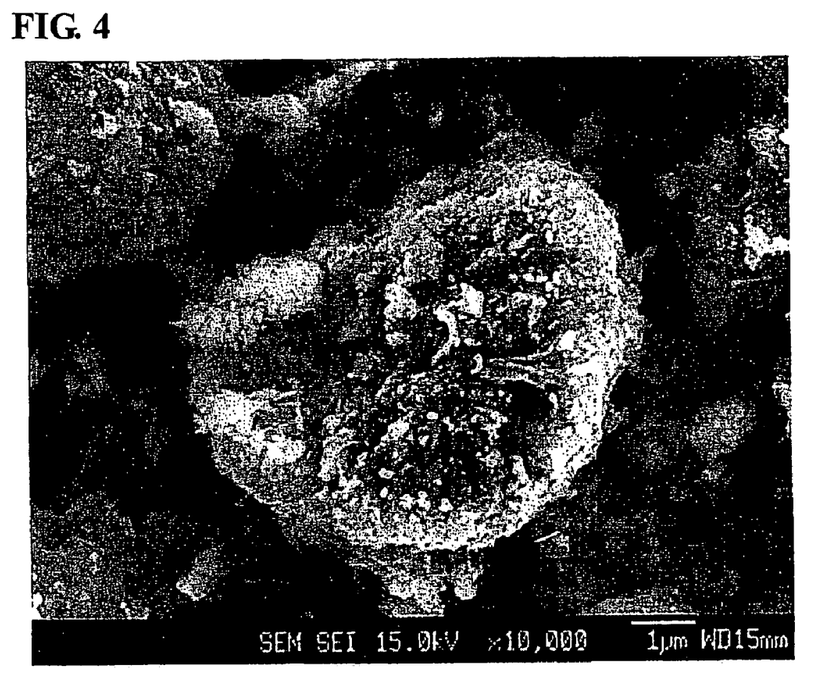
FIG. 4 is an SEM photograph of the cross-section of a $((Ni_{0.025}Mn_{0.975})_3O_4)_{0.7}(Ni_{0.25}Mn_{0.75}(OH)_2)_{0.3}$ precursor as a core-shell multilayer structure obtained in the present invention.
Figure 5:
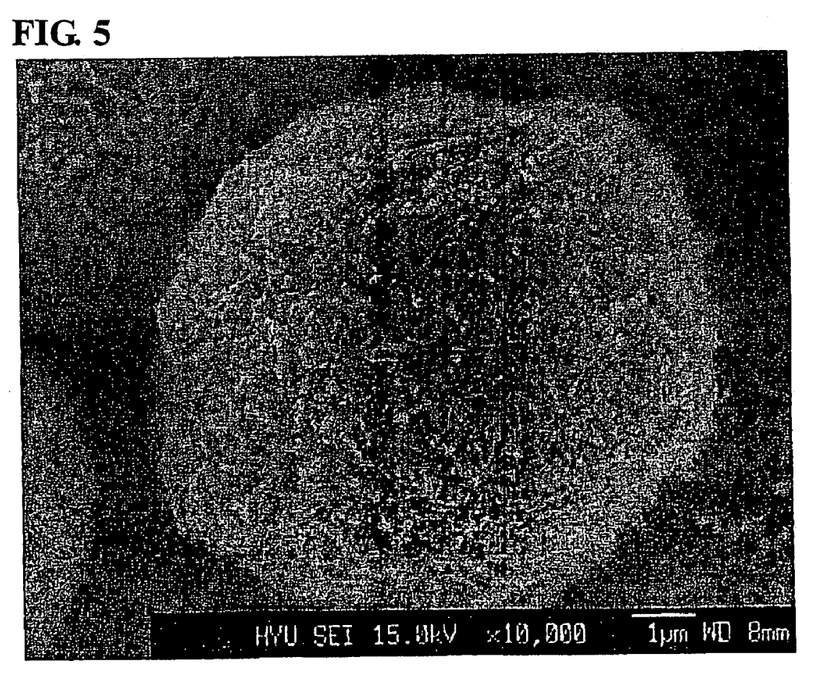
FIG. 5 is a cross-sectional SEM photograph of the surface of a $((Ni_{0.025}Mn_{0.975})_3O_4)_{0.7}(Ni_{0.25}Mn_{0.75}(OH)_2)_{0.3}$ precursor as a core-shell multilayer structure obtained in the present invention.
Figure 6:
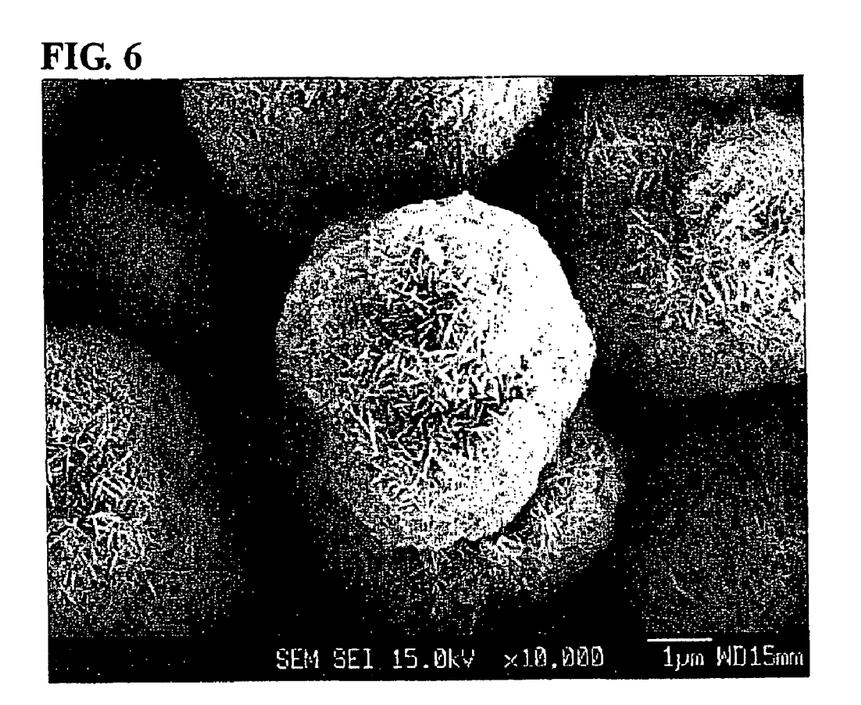
FIG. 6 is an SEM photograph of the surface of a precursor having a core-shell multilayer structure, obtained in Example 3 of the present invention.

SEM photographs of the core portion precursor and core-shell spinel precursor powder obtained in Example 1 are shown in FIGS. 3, 4 and 5, respectively. As can be seen in FIG. 3, the particles had a uniform size of about 5-8 μm, and, as can be seen in FIGS. 4 and 5, the particles were spherical in shape and had a uniform size of about 8-10 μm. Also, all of the powders had a spherical morphology. From the comparison between the SEM photographs of FIGS. 3 and 5, the core precursor and the core-shell structure had clearly different surfaces. Also, the core-shell structure surface shown in FIG. 6 was different from the surface shown in FIG. 5, due to the difference in shell composition between the two core-shell structures. Particularly, the core-shell structure can be seen in the cross-section of the powder in FIG. 4.

Figure 7:
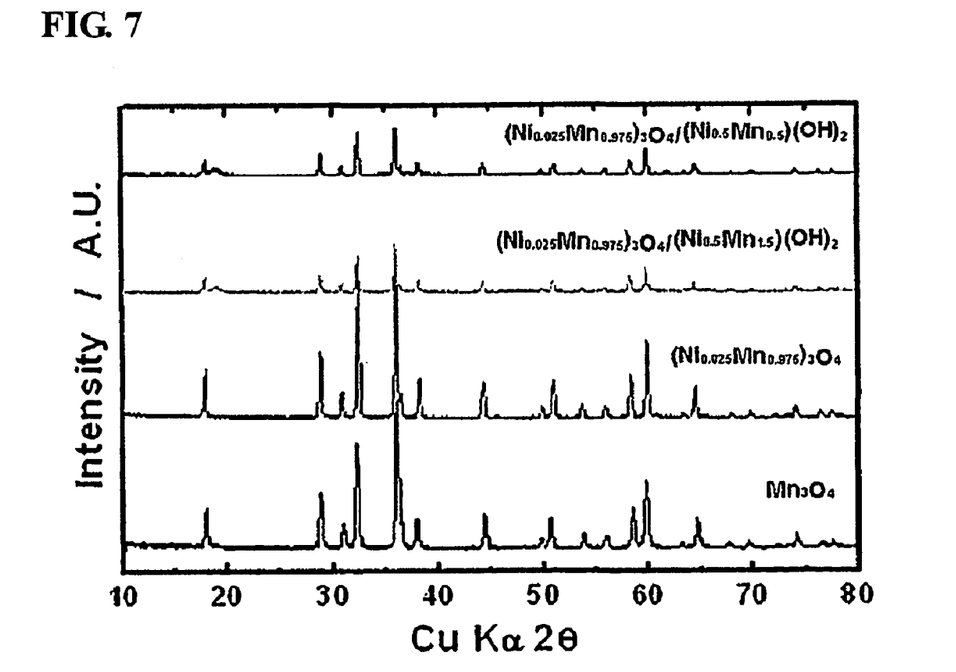
FIG. 7 shows the X-ray diffraction patterns of a core-shell multilayer precursor, obtained according to the present invention, and of a manganese precursor.
Figure 8:
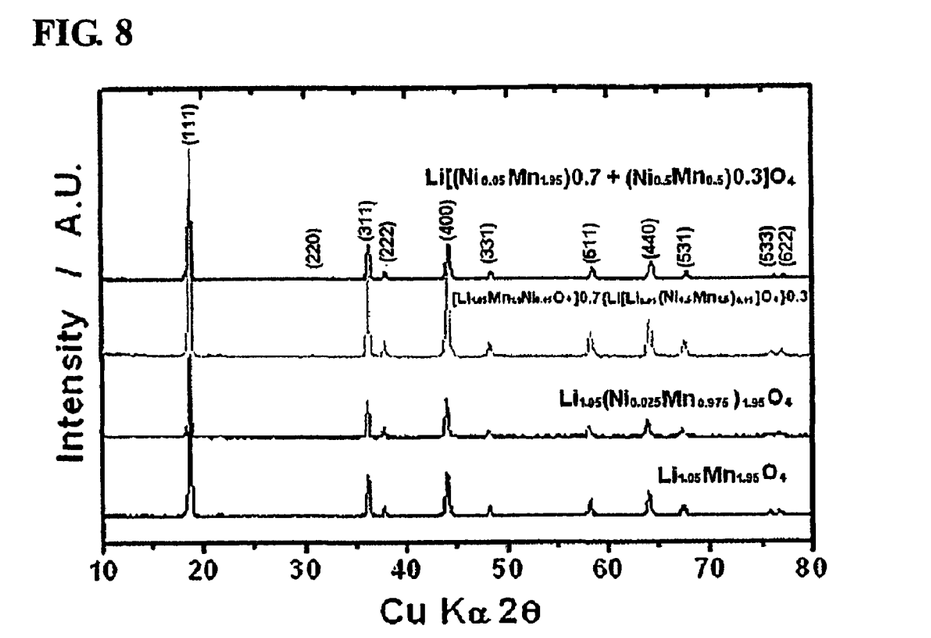
FIG. 8 shows the X-ray diffraction patterns of a core-shell multilayer cathode active material, obtained according to the present invention, and of a manganese oxide.
Figure 9:
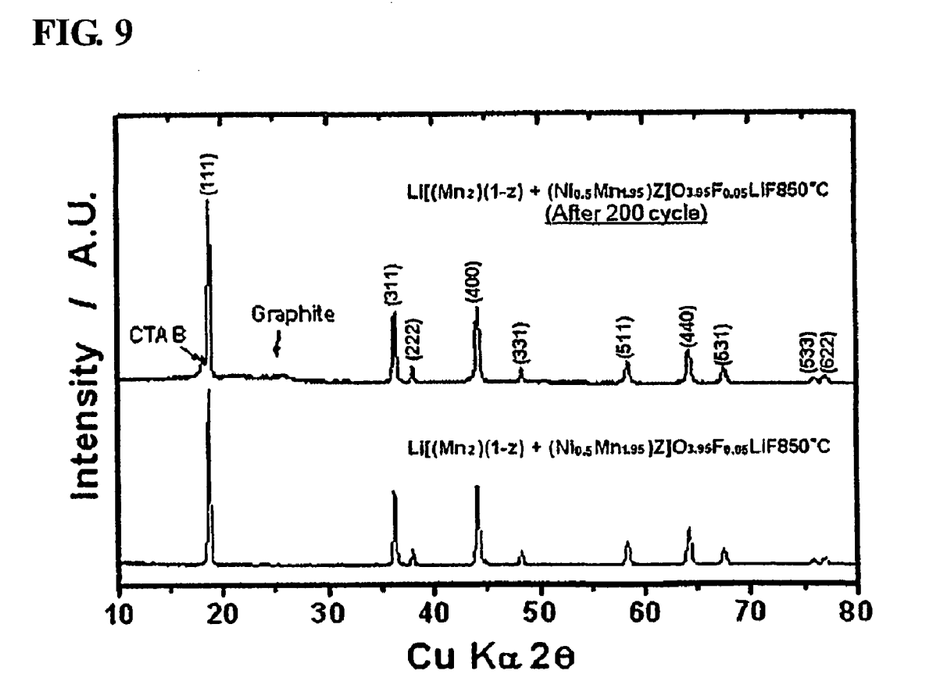
FIG. 9 shows comparative X-ray diffraction patterns of a core-shell multilayer fluorine-substituted cathode active material, obtained according to the present invention, and of the cathode active material subjected to a 200-cycle charge/discharge cycle test.

An X-ray diffraction analyzer (Model No. Rint-2000, Rigaku, Japan) was used to obtain X-ray diffraction patterns. As can be seen in FIG. 7, the analysis results of each of the core-shell precursors were slightly different from the peak of $Mn_3O_4$, depending on the composition thereof. FIG. 8 shows the X-ray diffraction analysis results of cathode active materials obtained after calcining the precursors shown in FIG. 7. As can be seen in FIG. 8, no peaks associated with impurities were found in the X-ray diffraction analysis results, and the calcined materials had a well-developed spinel cubic structure. FIG. 9 shows the X-ray diffraction results of the core-shell cathode active material, after a 200-cycle charge/discharge test conducted on a battery prepared using the core-shell cathode active material. As can be seen in FIG. 9, the core-shell cathode active material was well maintained without structural modification even after 200 charge/discharge cycles.

To access the characteristics of a battery comprising the core-shell cathode active material prepared in Example 1, a charge/discharge test was carried out using an electrochemical analyzer (Model No: Toscat 3000U, Toyo, Japan) at a high temperature of 60° C. in a potential range of 3.4-4.3V at a current density of 1.4 mA/cm². For this purpose, an electrode was made using the powder prepared in Example 1 as a cathode active material, and was dried in a vacuum at 120° C. A coin battery was fabricated according to a process conventionally known in the art, using the prepared cathode, a lithium metal as a counter electrode, a porous polyethylene membrane (Celgard LLC., Celgard 2300, thickness: 25 μm) as a separator, and a liquid electrolyte comprising 1M LiPF$_6$ dissolved in a mixed solution of ethylene carbonate and diethyl carbonate (1:1 v/v). The characteristics of the above-prepared battery comprising the inventive cathode active material were assessed using the electrochemical analyzer (Model No: Toscat 3100U, Toyo, Japan).

Figure 10:
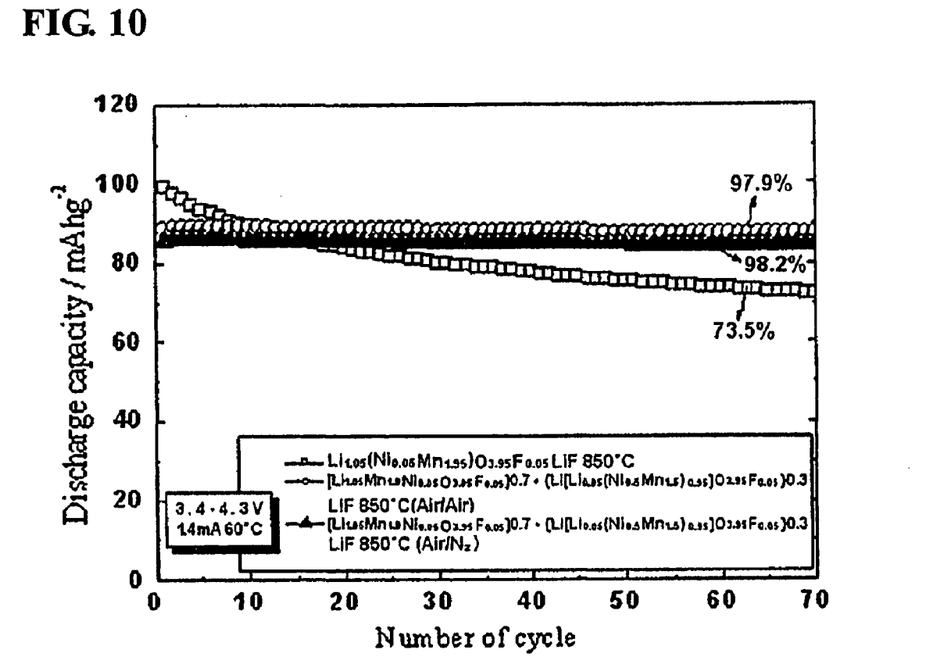
FIG. 10 graphically shows the cycle life characteristics of the cathode active materials synthesized in Example 1 and 2 and Comparative Example 1, as a function of the number of charge/discharge cycles at high temperature (60° C.).

FIG. 10 is a graphic diagram showing the discharge capacity versus cycle life at 60° C. of batteries comprising the core-shell spinel oxides prepared in Examples 1 and 2. As can be seen in FIG. 10, the cycle characteristics of the batteries were tested in a potential range of 3.4-4.3V, and as a result, the cycle characteristics of manganese spinel were very poor. The cathode active material having, as the shell portion, Li[Li$_{0.05}$(Ni$_{0.5}$Mn$_{1.5}$)$_{0.95}$]O$_{3.95}$F$_{0.05}$ synthesized to solve the problem of manganese dissolution, showed excellent capacity maintenance. Particularly, the active material having the shell portion synthesized in the nitrogen atmosphere showed the best characteristics. Also, the active material having fluorine (F) substituted in the oxygen site showed improved cycle properties. As can be seen in FIG. 10, the active material having no shell formed thereon showed capacity maintenance of 73.5% relative to initial capacity after 70 cycles, whereas those having the core-shell structure showed high capacity maintenances of 97.9%, for the shell synthesized in the oxygen atmosphere, and 98.2%, for the shell synthesized in the nitrogen atmosphere.

Figure 11:
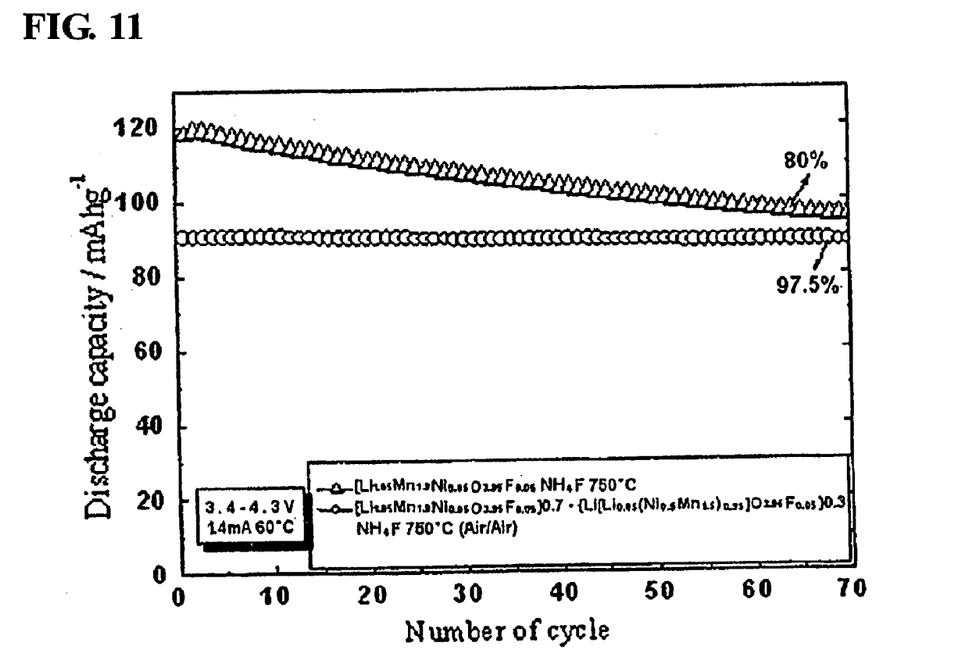
FIG. 11 graphically shows the cycle life characteristics of the cathode active materials synthesized in Example 8 and Comparative Example 5, as a function of the number of charge/discharge cycles at high temperature (60° C.).

FIG. 11 shows the test results of the active material synthesized using ammonium fluoride (NH$_4$F) instead of lithium fluoride in substitution with fluorine (F). As can be seen in FIG. 11, the active material synthesized using ammonium fluoride showed slightly reduced cycle characteristics compared to the active material synthesized using lithium fluoride, but showed a slight increase in performance due to the effect of fluorine, compared to the prior art.

Figure 12:
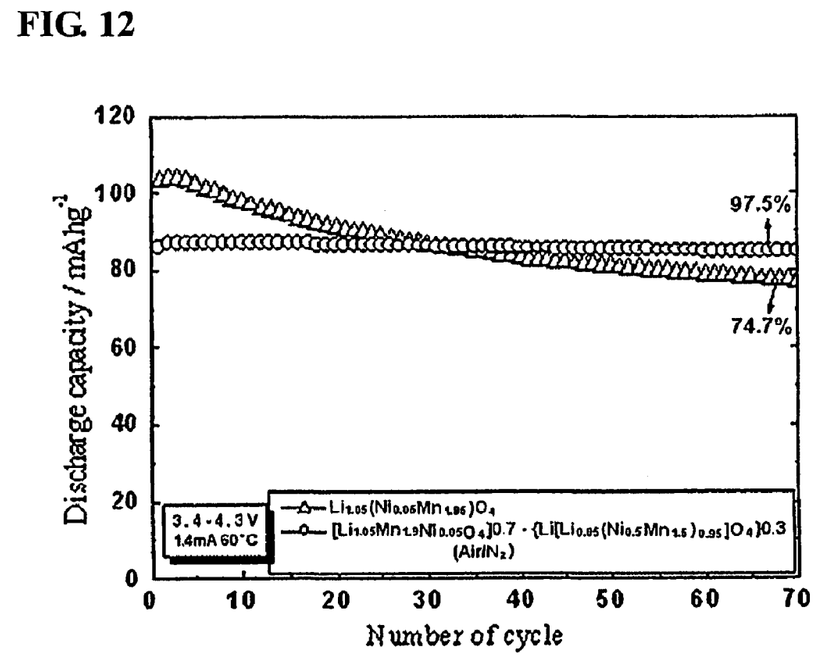
FIG. 12 graphically shows the cycle life characteristics of the cathode active materials synthesized in Example 3 and Comparative Example 2, as a function of the number of charge/discharge cycles at high temperature (60° C.).

FIG. 12 is a graphic diagram showing the comparison of cycle characteristics between Example 3 and Comparative Example 2. As can be seen in FIG. 12, Example 3 had reduced initial capacity, but had a good characteristic of capacity maintenance of 97.5% at 70 cycles. Also, Example 3 showed good characteristics without a substituent such as fluorine or sulfur.

Figure 13:
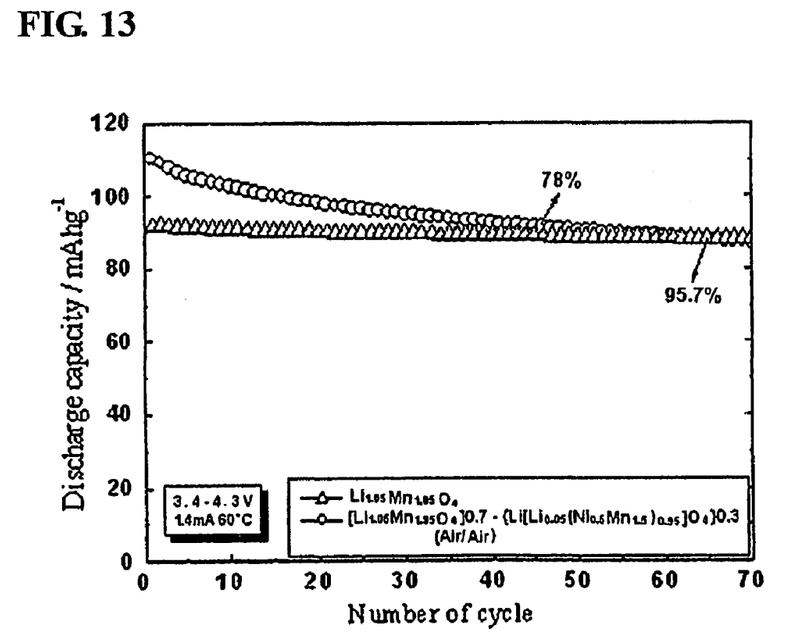
FIG. 13 graphically shows the cycle life characteristics of the cathode active materials synthesized in Example 7 and Comparative Example 4, as a function of the number of charge/discharge cycles at high temperature (60° C.).
Figure 14:
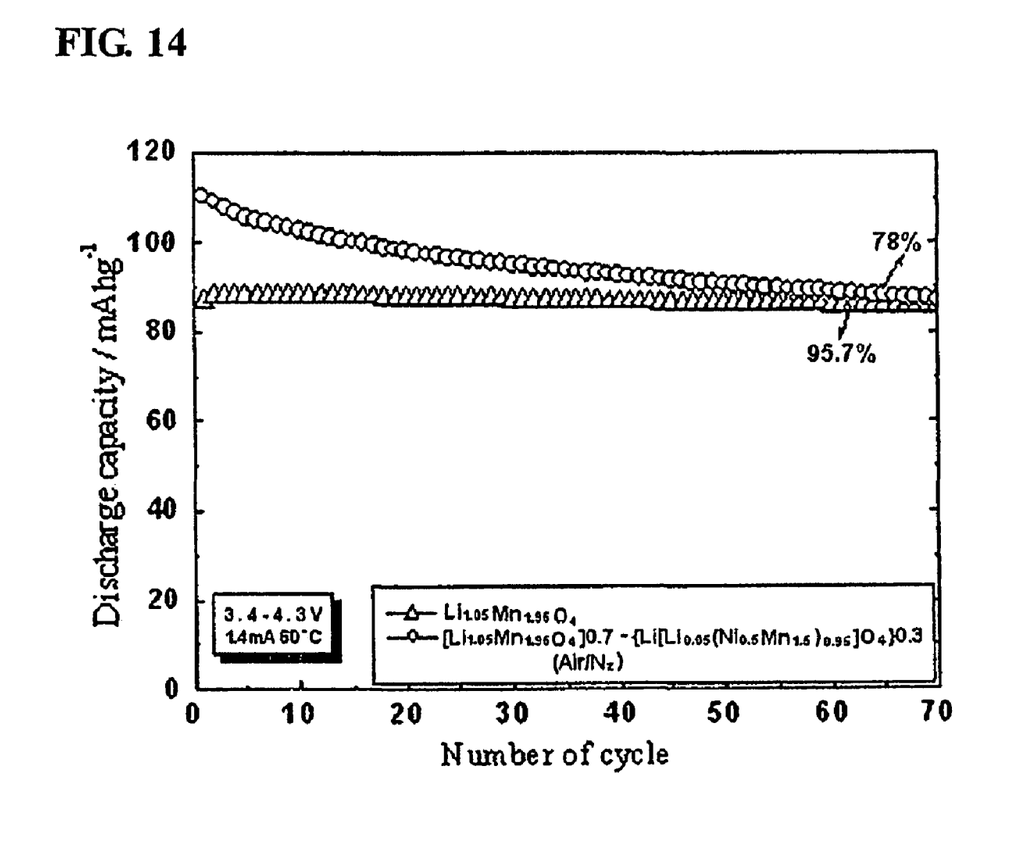
FIG. 14 graphically shows the cycle life characteristics of the cathode active materials synthesized in Example 6 and Comparative Example 4, as a function of the number of charge/discharge cycles at high temperature (60° C.).

FIGS. 13 and 14 show the cycle characteristics of the cathode positive materials having the shells synthesized in the air atmosphere and the nitrogen atmosphere, respectively. As can be seen in FIGS. 13 and 14, the cathode active materials having the core-shell structures showed very good results compared to the materials having no shell. However, the active materials having the shell synthesized in the nitrogen atmosphere showed a capacity maintenance ratio higher than the case of the shell synthesized in the air atmosphere, even though it had a slightly lower initial capacity. The cathode active materials having no shell had a capacity maintenance of about 78%, but those having the core-shell structure showed very high capacity maintenances of 97.6% for the shell synthesized in the nitrogen atmosphere, and 95.7% for the shell synthesized in the air atmosphere.

From the above results, it could be seen that the lithium secondary batteries comprising the inventive cathode active materials having the double-layer (core-shell) structure had excellent cycle life characteristics, because they showed excellent discharge capacity relative to initial capacity even at a severe experimental condition of 60° C.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A cathode active material for lithium secondary batteries, which has a core-shell multilayer structure, in which the core portion is made of Li$_{1+a}$Mn$_{2-a}$O$_{4-y}$A$_y$ (wherein A is at least one element selected from among F and S, $0.04 \leq a \leq 0.15$, and $0.02 \leq y \leq 0.15$), and the shell portion is made of Li[Li$_a$(Mn$_{1-x}$M$_x$)$_{1-a}$]2O$_{4-y}$A$_y$ (wherein M is at least one element selected from the group consisting of Fe, Co, Ni, Cu, Cr, V, Ti and Zn, A is at least one element selected from among F and S, $0.01 \leq a \leq 0.333$, $0.01 \leq x \leq 0.6$, and $0.02 \leq y \leq 0.15$).

2. The cathode active material of claim 1, wherein the shell portion has a thickness corresponding to 1-50% of the total radius of the cathode active material.

3. The cathode active material of claim 1, wherein the cathode active material has a particle diameter of 1-50 μm.

4. An electrode for lithium secondary batteries, which comprises a cathode active material as set forth in claim 1.

5. A lithium secondary battery comprising an electrode as set forth in claim 4.

6. A cathode active material for lithium secondary batteries, which has a core-cell multilayer structure, in which the core portion is made of Li$_{1+a}$[Mn$_{1-x}$M$_x$]$_{2-a}$O$_{4-y}$A$_y$ (wherein M is at least one element selected from the group consisting of Mg, Ca, Sr, Al, Ga, Fe, Co, Ni, V, Ti, Cr, Cu, Zn, Zr, In, Sb, P, Ge, Sn, Mo and W, A is at least one element selected from among F and S, $0.04 \leq a \leq 0.15$, $0.02 \leq x \leq 0.25$, and $0.02 \leq y \leq 0.15$), and the shell portion is made of Li[Li$_a$(Mn$_{1-x}$M$_x$)$_{1-a}$]2O$_{4-y}$A$_y$ (wherein M is at least one element selected from the group consisting of Fe, Co, Ni, Cu, Cr, V, Ti and Zn, A is at least one element selected from among F and S, $0.01 \leq a \leq 0.333$, $0.01 \leq x \leq 0.6$, and $0.02 \leq y \leq 50.15$).

7. The cathode active material of claim 6, wherein the shell portion has a thickness corresponding to 1-50% of the total radius of the cathode active material.

8. The cathode active material of claim 6, wherein the cathode active material has a particle diameter of 1-50 μm.

9. An electrode for lithium secondary batteries, which comprises a cathode active material as set forth in claim 6.

10. A lithium secondary battery comprising an electrode as set forth in claim 9.

11. A method for preparing a cathode active material for lithium secondary batteries, having a core-shell multilayer structure, the method comprising the steps of:
  a) introducing an aqueous ammonia solution or ammonium sulfate ((NH$_4$)$_2$SO$_4$), an aqueous manganese composite metal salt solution and a basic aqueous solution into a reactor having an air atmosphere, and mixing the solutions with each other in the reactor, to obtain a spherical composite metal oxide precipitate;
  b) mixing an aqueous ammonia solution or ammonium sulfate ((NH$_4$)$_2$SO$_4$), said spherical composite metal oxide precipitate, a transition metal-containing metal salt aqueous solution and a basic aqueous solution with each other in a reactor having a nitrogen atmosphere to obtain a double-layer composite metal hydroxide precipitate having a core-shell structure containing transition metal hydroxide as the shell;

c) filtering said composite metal oxide-composite metal hydroxide precipitate, washing the filtrated material with water, drying the washed material to obtain a $[(M_xMn_{1-x})_3O_4]_{1-z}[(M'_yMn_{1-y})(OH)_2]_z$ precursor, and drying or pre-heat treating the precursor; and d) mixing said precursor with any one selected from among lithium hydroxide (LiOH)/lithium fluoride (LiF), lithium hydroxide (LiOH)/lithium sulfide (Li$_2$S), and lithium hydroxide (LiOH)/solid sulfur, at a desired composition ratio, maintaining the mixture at 400-650° for 5-10 hours, grinding the resulting mixture, calcining the powder at 700-1100° for 6-25 hours, and annealing the calcined powder at 500-700° for 10 hours to form the cathode active material as claimed in claim 1.

12. The method of claim 11, wherein the metal salt in each of the steps a) and b) is any one selected from among sulfate, nitrate, acetate, chloride and phosphate.

13. The method of claim 11, wherein the basic aqueous solution in each of the step a) and b) is an aqueous solution of sodium hydroxide (NaOH) or potassium hydroxide (KOH).

14. The method of claim 11, wherein the manganese composite metal salt aqueous solution used in the step a) is prepared by mixing Mn with at least one metal salt selected from the group consisting of Mg, Ca, Sr, Al, Ga, Fe, Co, Ni, V, Ti, Cr, Cu, Zn, Zr, In, Sb, P, Ge, Sn, Mo and W, and dissolving the mixture in water to a concentration of 0.5-3 M, the aqueous ammonia solution is used at a concentration corresponding to 20-40% of the concentration of the manganese composite metal salt aqueous solution, and the aqueous basic solution is used at a concentration of 4-5 M.

15. The method of claim 11, wherein the transition metal-containing metal salt aqueous solution used in the step b) is prepared by mixing Mn with at least one metal salt selected from the group consisting of Fe, Co, Ni, Cu, Cr, V, Ti and Zn and dissolving the mixture in water to a concentration of 0.5-3 M, the aqueous ammonia solution is used at a concentration corresponding to 20-40% of the concentration of the transition metal-containing metal salt aqueous solution, and the aqueous basic solution is used at a concentration of 4-5 M.

16. The method of claim 11, wherein reactor contents in the step a) have a pH of 9.5-10.5, a reaction temperature in the step a) is 30-80°, and a rotating speed of a stirrer in the reactor is 500-2000 rpm.

17. The method of claim 11, wherein reactor contents in the step b) have a pH of 10.5-12.5, a reaction temperature in the step b) is 30-80°, and a rotating speed of a stirrer in the reactor is 500-2000 rpm.

18. The method of claim 11, wherein reaction time in the step b) is controlled to 0.5-10 hours to control a thickness of the shell layer.

19. The method of claim 11, wherein the drying or pre-heating in the step (c) is drying at 110° for 15 hours or heating at 400-550° for 5-10 hours.

* * * * *